United States Patent
Uenoyama et al.

[15] 3,656,496
[45] Apr. 18, 1972

[54] DEVICE FOR CONTROLLING HYDRAULIC PRESSURE

[72] Inventors: Masaru Uenoyama; Makoto Yaoeda, both of Komatsu, Japan

[73] Assignee: Kabushiki Kaisha Komatsu Seisakusho, Tokyo, Japan

[22] Filed: Aug. 4, 1970

[21] Appl. No.: 60,894

[30] Foreign Application Priority Data

Aug. 6, 1969 Japan..................................44/62574

[52] U.S. Cl..........................................137/116.3, 137/115
[51] Int. Cl. ........................................................G05d 16/16
[58] Field of Search..................137/116.3, 115, 116, 116.5, 137/109

[56] References Cited

UNITED STATES PATENTS

| 2,654,975 | 10/1953 | Adams | 137/116.3 |
| 3,137,311 | 6/1964 | Ronweder | 137/116.3 |
| 3,143,127 | 8/1964 | Frost | 137/116.3 |
| 3,225,619 | 12/1965 | Schaefer | 137/116.3 |

Primary Examiner—Herbert F. Ross
Assistant Examiner—William H. Wright
Attorney—James E. Armstrong and Ronald S. Cornell

[57] ABSTRACT

A device for controlling hydraulic pressure of a transmission having a clutch member operated by hydraulic pressure including means capable of changing the predetermined pressure of fluid within the system.

6 Claims, 1 Drawing Figure

PATENTED APR 18 1972
3,656,496
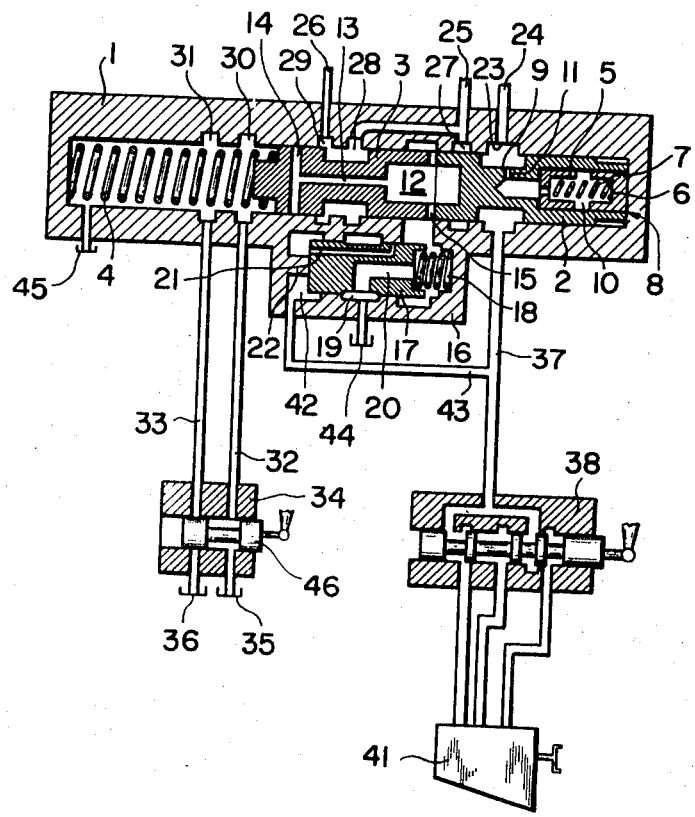

DEVICE FOR CONTROLLING HYDRAULIC PRESSURE

BACKGROUND OF THE INVENTION

In accordance with conventional devices for controlling hydraulic pressure, the increase of clutch torque is carried out by providing a pressure reducing valve in the middle of the fluid circuit towards the specific clutch member, and in accordance with conventional devices for controlling hydraulic pressure it is impossible to change the predetermined maximum pressure of the hydraulic fluid, instead, in these conventional devices pressure control of the hydraulic fluid against a plural number of clutch members is unchangeable.

SUMMARY OF THE INVENTION

The present invention is an improvement over the above mentioned conventional devices, and the object of the present invention is to provide a device for controlling hydraulic pressure and for changing the maximum predetermined pressure of the fluid, by separately carrying out the removal or exhaustion of the fluid within a hydraulic chamber of a relief valve by reciprocating the relief valve in accordance with pressure changes in its hydraulic chamber and in the hydraulic chamber of a valve for gradually increasing pressure, which latter hydraulic chamber has a larger area for receiving fluid than the hydraulic chamber of the relief valve, and by introducing fluid into the larger chamber at a time difference from the hydraulic chamber of the relief valve.

In accordance with the invention there is provided a device for controlling hydraulic pressure of a transmission having a clutch member operated by hydraulic pressure. More particularly the device controls hydraulic pressure by draining fluid by moving a relief valve against a pressure adjusting spring with the fluid introduced into a first hydraulic pressure chamber from a fluid supply source, introducing said fluid having been introduced into the valve with the time difference by means of a feed-exhaust valve after having balanced the pressure within the first hydraulic pressure chamber and the spring force of the pressure adjusting spring, moving a valve for gradually increasing pressure by further compressing the pressure adjusting spring when the hydraulic pressure within the chamber becomes higher than the pressure of the fluid of the first hydraulic pressure chamber, retreating the relief valve to prevent the escape of fluid into the drain port to further increase the hydraulic pressure within the first hydraulic pressure chamber as the hydraulic pressure of the second hydraulic pressure chamber and the hydraulic pressure of the first hydraulic pressure chamber can be balanced, to the effect that the hydraulic pressure of the second hydraulic pressure chamber can be increased, and the similar effects as the above mentioned effect can be given to the valve for gradually increasing the hydraulic pressure and to the relief valve, wherein the predetermined pressure can be controlled separately by carrying out the removal of the fluid from the second hydraulic pressure chamber by either of a plurality of outlet pipes by utilizing the fact that the hydraulic pressure of the second hydraulic pressure is balanced with the force of the pressure adjusting spring by the removal of the fluid of the second hydraulic pressure chamber.

BRIEF DESCRIPTION OF THE DRAWING

The following is an explanation about the present invention in accordance with the attached drawing which is a cross-sectional view taken through the hydraulic control device of the invention.

DETAILED DESCRIPTION

In the attached diagram, 1 is a control valve, and a relief valve 2 and a valve 3 for gradually increasing the hydraulic pressure are movable positioned within control valve 1. Valve 3 for gradually increasing the hydraulic pressure and the relief valve 2 are pressed towards the right direction (in one diagram) by pressure adjusting spring 4.

A vibration preventing mechanism 8 composed of piston 5 with orifice, load piston 6, and a spring 7 provided between said two pistons 5 and 6, is provided in the right inside portion of said relief valve 2.

A circular groove 9 is formed in the central peripheral portion of the relief valve 2, and is connected to the first hydraulic pressure chamber 10 formed by said groove 9 and said two pistons 5 and 6 through the inlet hole 11.

A second hydraulic pressure chamber 12 is composed of a cavity formed between the abutting ends of relief valve 2 and valve 3 for gradually increasing hydraulic pressure. The pressure receiving area of the second hydraulic pressure chamber 12 is larger than the first hydraulic pressure chamber 10. Said second hydraulic pressure chamber 12 is connected to the periphery of valve 3 through the orifice paths 13 and 14 formed in valve 3. Said second hydraulic pressure chamber 12 is connected to valve housing 16 formed on said valve 1 through the conduit hole 15 formed on said abutting ends of valves 2 and 3.

A feed valve 17 for feeding fluid is movably inserted into the valve housing 16, and said feed valve 17 is biased to the left by the spring 18, where it contacts the projection 22. A ring form groove 19 is formed on the periphery of said feed valve 17, and aperture 20 connects said ring form groove 19 to the right end of said feed valve 17. A control orifice 21 connects the left end surface of valve 17 to its periphery. The third hydraulic pressure chamber 42 surrounding said projection 22 is formed on the left side of the feed valve 17.

The ring form groove 9 of said relief valve 2 faces a ring form groove 23 on the main body. A conduit 24 is connected to a source of feed and is open to said ring form groove 23. The ring form grooves 27, 28 and 29 where the drain pipes 25 and 26 are opened at predetermined intervals are formed towards the left side of said ring form groove 23. The ring form grooves 30 and 31 are formed at equal intervals axially displaced towards the left in the internal peripheral surface of said body 1. One end of each of the outlet pipes 32 and 33 is opened to the ring form grooves 30 and 31, and the other end of each of said pipes 32 and 33 is connected to the inlet side of the switch valve 34. The outlet side of said switch valve 34 is connected to the tanks 35 and 36. One end of the pipe 37 is connected to the inlet side of the switch valve 38 for working differential effect on the fluid selectively towards a plural number of clutch members of the transmission 41. A pipe 43 is branched from the middle of said pipe 37, and said pipe 43 is opened to the third hydraulic pressure chamber 42. In the diagram, 44 and 45 are the tanks connected to the ring form groove 19 and the valve 1.

Thus, the fluid from the fluid source enters the valve 1 through the pipe 24, flows into the pipe 37 through the ring form groove 9 on the relief valve 2, and arrives at the clutch member pressing cylinder of the transmission 41 which is selected by the switch valve 38 and is filled in said pipe 37. As fluid enters into and fills said pipe 37, the pressure is increased, and the fluid is filled into the first hydraulic pressure chamber 10 through the conduit hole 11, and along with the increase of the pressure the relief valve 2 and valve 3 are forced to the left against the spring force of the pressure adjusting spring 4. The ring form groove 9 of the relief valve 2 becomes connected to the ring form groove 27 where the drain pipe 25 is opened, and the fluid within the pipe 37 is flowed into the drain pipe 25. The hydraulic pressure in this case is controlled by the force compressing the pressure adjusting spring 4, and the primary pressure for balancing force and for retaining the relief valve 2 in the open state. On the other hand, fluid is flowed into the third hydraulic pressure chamber 42 of the feed valve 17 from the pipe 43 branched from the pipe 37, and the feed valve 17 is moved to the right against the spring force of the spring 18.

Therefore, the fluid of the third hydraulic pressure chamber 42 is gradually filled into the second hydraulic pressure chamber 12 through the control orifice 21 and the conduit hole 15. The fulfillment of the fluid into the second hydraulic pressure chamber 12 is delayed from the fulfillment of the fluid into the first hydraulic pressure chamber, and the time difference is determined by the control orifice 21.

When the hydraulic pressure of said second hydraulic pressure chamber 12 becomes higher than the hydraulic pressure of the first hydraulic pressure chamber 10, the balance between the hydraulic pressure of the first hydraulic pressure chamber 10, therefore, the repelling force of the pressure adjusting spring 4 is broken, the valve 3 for gradually increasing the hydraulic pressure further compresses the pressure adjusting spring 4 to move the same to the left, the hydraulic pressure in proportion to the compressing force of the pressure adjusting spring 4 is increased, and the relief valve 2 is repositioned to the right.

Along with the repositioning of said relief valve 2, passage of fluid from the ring form groove 9 to the drain pipe 25 is prevented, and therefore the hydraulic pressure of the first hydraulic pressure chamber 10 is further increased to keep the balance of power. The increase of the hydraulic pressure of the first hydraulic pressure chamber 10 is again transferred from the pipe 37 to the second hydraulic pressure chamber 12 with a time delay and therefore the hydraulic pressure of the second hydraulic pressure chamber 12 is further increased, and the same effect as before can be given to the valve 3 and the relief valve 2.

Thus, the hydraulic pressure of the pipe 37 is gradually increased, and the smooth engagement of the clutch member can be controlled. Such an increase of the hydraulic pressure is carried out til the fluid of the second hydraulic pressure chamber 12 is jetted out to the outlet pipe 32 or 33 through the orifice-paths 13 and 14 of valve 3. The hydraulic pressure of the second hydraulic pressure chamber 12 is balanced with the force of the pressure adjusting spring 4 when the fluid is jetted out, and the movement of valve 3 comes to a stop to adjust the hydraulic pressure to a predetermined pressure. The predetermined pressure can be changed by selecting either the outlet pipe 32 or the other outlet pipe 33 for removing the fluid of the second hydraulic pressure chamber 12, and the switching can be controlled by operating spool 46 of the switch valve 34.

When the direction of the fluid of the clutch member is changed to another clutch member by the switch valve 38, the respective valves are returned by the drop of the hydraulic pressure to the positions shown in the drawing, and it again operates to gradually increase the hydraulic pressure.

The above describes the structure of the hydraulic pressure control device of the present invention. In accordance with the invention, it will be seen that within the housing of the control valve, there are slideably positioned a valve for gradually increasing hydraulic pressure and a relief valve having a first hydraulic pressure chamber into which the fluid flows. The first hydraulic pressure chamber is connected to the transmission and to the fluid supplying source, and said valve for gradually increasing the hydraulic pressure is pushed by the pressure adjusting spring to contact the relief valve. A second hydraulic pressure chamber, having a larger pressure receiving area than that of the first hydraulic pressure chamber, is formed between the contacting portions of the valves 2 and 3, and the fluid introduced into the control valve 1 is connected to the second hydraulic chamber through a feed-exhaust valve with time difference from the first hydraulic chamber. A drain port is provided for releasing the liquid that has been led into the valve body when the relief valve is moved against the pressure adjusting spring by the hydraulic pressure in the first hydraulic pressure chamber. There is provided within said valve body, and on the back pressure side of the valve 3, a plurality of outlet pipes for selectively removing the fluid of the second hydraulic pressure chamber when the valve 3 is moved against the pressure adjusting spring 4 by the hydraulic pressure of the second hydraulic pressure chamber. These outlet pipes are spaced along the axial direction of the valve body with appropriate intervals between said outlet pipes, and therefore the fluid that has been introduced into the valve body can escape into the drain port. The relief valve 2 is then moved by the pressure adjusting spring 4 until the pressure created by the fluid introduced into the first hydraulic pressure chamber is increased sufficiently to keep the balance of power between the hydraulic pressure of the first hydraulic pressure chamber and the hydraulic pressure of the second hydraulic pressure chamber. The same effect as described above is then again imparted to the valve 3 and the relief valve 2.

An increase of the hydraulic pressure is thereby carried out until the fluid of the second hydraulic pressure chamber is jetted out from the outlet pipe, and the hydraulic pressure of the second hydraulic pressure chamber is balanced with the force of the pressure adjusting spring to stop the movement of the valve for gradually increasing the hydraulic pressure, and the hydraulic pressure can be brought to a predetermined pressure. The predetermined pressure in the above case can be changed by carrying out the removal of the fluid within the second hydraulic pressure chamber with either of the outlet pipes.

What is claimed is:

1. A hydraulic pressure control device comprising a valve housing, a relief valve having a first hydraulic pressure chamber, said relief valve being movably positioned in said valve housing, a second valve member for gradually increasing hydraulic pressure, said second valve member being movably mounted in said valve housing, means for biasing said second valve against said relief valve, the abutting ends of said second valve and said relief valve being so that they form a second hydraulic pressure chamber therebetween, said second hydraulic pressure chamber having a larger pressure receiving area than said first hydraulic pressure chamber, means for flowing a hydraulic fluid into said valve housing, and means to pass hydraulic fluid from said valve housing to a transmission means, means between said valve housing and said transmission to pass hydraulic fluid into said second hydraulic pressure chamber, whereupon the hydraulic fluid passing into said valve housing enters said first and second hydraulic pressure chambers therein and said movable valve member are forced by the pressure in said chambers against said biasing means, and means to remove hydraulic fluid from said first hydraulic pressure chamber as said relief valve moves against the said biasing means.

2. The hydraulic pressure control device of claim 1, and further including a plurality of spaced outlet pipes for selectively releasing the hydraulic fluid from said second hydraulic pressure chamber when said second valve member moves against said biasing means.

3. The hydraulic pressure control device of claim 2 wherein said biasing means constitutes a spring.

4. The hydraulic pressure control device of claim 2 wherein said second valve member includes passage means leading from said second hydraulic pressure chamber to the periphery of said second valve member and said valve housing includes a plurality of ring-shaped grooves axially spaced along the inner surface of said valve housing, said ring-shaped grooves being connected to said outlet pipes and being adapted to receive hydraulic fluid from said passage mean in said second valve member.

5. The hydraulic pressure control device of claim 4, and further including valve means on said outlet pipes.

6. A hydraulic pressure control device according to claim 2 and further including means to delay the pressure build-up in said second hydraulic chamber said means comprising a movable valve member positioned within a housing and adapted to receive said hydraulic fluid at one end thereof, means for axially biasing said movable valve member towards said one end whereby hydraulic fluid entering said housing will operate to move said member towards said biasing means, said valve member containing a small diameter control orifice therein, said orifice having adapted to slowly pass fluid from said receiving end to said second hydraulic pressure chamber when said valve member moves towards said biasing means.

* * * * *